Dec. 20, 1955  E. J. MAGINN ET AL  2,727,643
PALLET RETRIEVER FOR INDUSTRIAL TRUCK
Filed Nov. 10, 1952  2 Sheets-Sheet 1

INVENTORS.
EDWARD J. MAGINN
BRUCE A. HORTON
BY
ATTYS.

Dec. 20, 1955  E. J. MAGINN ET AL  2,727,643
PALLET RETRIEVER FOR INDUSTRIAL TRUCK
Filed Nov. 10, 1952  2 Sheets-Sheet 2

INVENTOR.
EDWARD J. MAGINN
BRUCE A. HORTON
BY
ATTYS.

United States Patent Office 2,727,643
Patented Dec. 20, 1955

2,727,643

PALLET RETRIEVER FOR INDUSTRIAL TRUCK

Edward J. Maginn and Bruce A. Horton, Richmond, Ind., assignors to Clark Equipment Company, Buchanan, Mich., a corporation of Michigan Application November 10, 1952, Serial No. 319,661

5 Claims. (Cl. 214—514)

Our present invention relates generally to pallet retrieving means for use with an industrial truck and, more particularly, is directed to a device adapted to facilitate the withdrawal of a sheet-like pallet from beneath a load.

Our present invention is particularly adapted for use with an industrial truck having an upwardly and downwardly movable load supporting carriage to which is secured horizontal forwardly extending load supporting means. A vertical load engaging rack extends transversely of the load supporting means, and means is provided between the load supporting carriage and the rack for moving the latter fore and aft above the load supporting means. The rack along its lower edge is further provided with clamp means. In the operation of the aforenoted mechanism, the rack is extended toward the forward end of the load supporting means so that the clamp means may be disposed in engagement with the leading edge of a sheet-like pallet upon which a load is stacked. Upon retraction of the rack toward the load supporting carriage, the pallet and load are pulled upon the load supporting means after which the load may be transported to a place of deposit by the industrial truck. At the proper point of deposit, the rack is extended thereby pushing the load and pallet from the load supporting means. The described mechanism is incapable of pushing the load from the pallet or pulling the pallet from beneath the load and, thus, if it becomes desirable to separate the pallet from the load, such operation must be performed manually.

It is a primary object of our present invention to provide a device for use with a mechanism of the foregoing description which will, in cooperation therewith, facilitate the withdrawal of a sheet-like pallet from beneath a load.

In the accomplishment of the aforenoted object, we contemplate the provision of generally U-shape frame means extending forwardly from the load supporting carriage with the bight portion thereof lying above the forward edge of the load supporting means whereby the bight portion may serve to receive the force exerted by the side of a load as the clamp means engages the leading edge of a sheet-like pallet upon which the load rests, and draws the pallet upon the load supporting means from beneath the load, when the rack is retracted toward the load supporting carriage from its forwardmost position.

It is another object of our present invention to provide the U-shape frame means with a yieldable bight portion so that the latter may remain in full contact with the rack during final movement of the rack to its forwardmost position to prevent the bight portion from interfering with the operation of the clamp means in engaging the leading edge of a sheet-like pallet.

In the accomplishment of this object, the U-shape frame means is formed of arm members pivotally mounted about a transverse axis to the load supporting carriage at the lower end thereof. A bar member extending transversely of the load supporting means is provided at its ends with flanges which project at right angles therefrom. The flanges are mounted to the free ends of the arm members for limited longitudinal movement relative thereto and spring means are provided for normally biasing the flanges toward the pivotal mountings of the arm members. The spring means permit the bar to yield as the rack contacts the same during final movement to its forwardmost position and thus the bar is in full contact with the rack during the final phase of movement of the latter. This relationship between the rack and bar insures that the rack may be disposed closely adjacent to the load so that the clamp means may be properly positioned to securely grip the projecting edge of the sheet-like pallet.

It is a further object of our present invention to provide means for swinging the U-shape frame means to a substantially inoperative vertical position after which the same may be locked in such inoperative position.

The means for swinging the frame means and for locking the same in an inoperative position comprises a flange secured to one of the arm members at right angles thereto. A bracket having an opening therein is mounted to one side of the load supporting carriage and projecting through the opening is a control rod which is pivotally connected to the arm flange. The control rod is adapted to be drawn rearward for swinging the arm members to an inoperative vertical position while the arm flange is adapted to project through the bracket opening when the arm members are substantially vertical. Thus, when the control rod is permitted to pivot vertically downward, the arm flange is locked within the bracket for maintaining the arm members in a vertical position.

Now, in order to acquaint those skilled in the art with the manner of constructing and using pallet retrieving means in accordance with the principles of our present invention, we shall describe in connection with the accompanying drawings, a preferred embodiment of our present invention.

Figure 1:
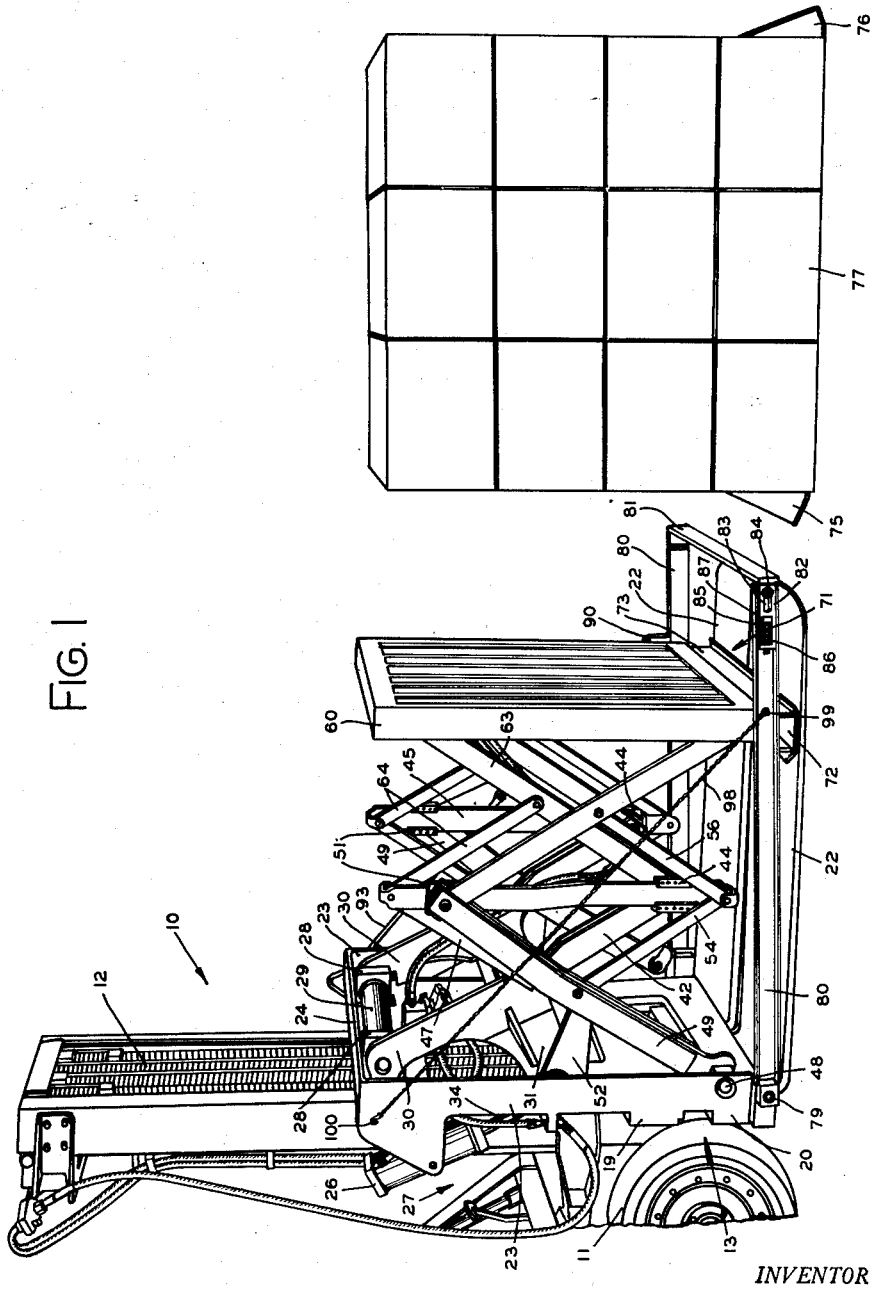
Figure 1 is a perspective view of an industrial truck with which clamp means and the pallet retrieving means of our present invention is embodied.

Referring now to the drawings, there is shown the front portion of an industrial truck indicated generally by the reference numeral 10 having a pair of forward driving wheels 11. The truck 10, adjacent its forward end, is provided with a vertical mast 12 in which is slidably mounted for upward and downward movement a load supporting carriage indicated generally by the reference numeral 13. The truck is provided with a power plant such as an internal combustion engine having pump means associated therewith for developing fluid under pressure which may be used for raising and lowering the load supporting carriage 13.

Mounted to the forward vertical surface of the load supporting carriage 13 are a pair of vertically spaced frame members 19 and 20 which extend transversely of the industrial truck 10. Secured to the frame members 19 and 20 are a pair of forwardly extending L-shape load supporting forks 22. In place of the forks 22 a solid supporting apron may be employed or a plurality of narrower forks may be used for supporting a load carried by the truck 10.

Vertically extending side frame members 23, which are secured to the front surfaces of the frame members 19 and 20, are interconnected adjacent their upper ends by means of a horizontally extending transverse angle frame member 24.

Mounted within the confines of the horizontal transverse angle frame member 24 are a pair of spaced bearing blocks 28 in which are journaled the ends of a horizontally extending shaft 29. Fixed to the outer ends of the shaft 29, outwardly of the bearing blocks 28, are a pair of forwardly downwardly extending arm members 30 which are provided with laterally offset portions 31 pivotally mounted at their outer ends to the piston rods 34 of hydraulic piston and cylinder assemblies indicated generally at 27. The cylinders 26 of the actuating assemblies 27 are pivotally mounted to the side frame members 23.

The outer ends of arm members 30 are each mounted between the one ends of a pair of link members 42. Each pair of link members 42 extends forwardly and downwardly and adjacent their lower ends are pivotally mounted to shoe members 44 slidingly mounted on the lower portions of vertically extending guide frame members 45. The upper ends of the guide frame members 45 are bent over and pivotally mounted therebetween are the one ends of link members 47, which, at their other ends, are pivotally mounted to the outer ends of the aforementioned arm members 30.

Pivotally mounted about pin members 48, adjacent the lower ends of each of the vertically extending side frame members 23, are pairs of forwardly upwardly extending arm members 49. Each pair of arm members 49 adjacent their upper ends are pivotally mounted to shoe members 51 slidingly mounted on the upper portions of the aforedescribed vertical guide frame members 45.

Pivotally mounted to the outer ends of the piston rods 34 are the one ends of link members 52 which, at their other ends, are pivotally mounted between each pair of arm members 49 intermediate of the ends thereof. Pivotally mounted inwardly of the pair of arm members 49 are link members 54 which extend forwardly and downwardly and are pivotally mounted adjacent their lower ends to the lower upturned portions of the vertical guide frame members 45.

A pair of forwardly and downwardly extending arm members 58 are pivotally mounted at their upper ends between each pair of arm members 49. The arm members 58, at their lower ends, are pivotally mounted to the sides of a vertically extending rectangular load engaging rack 60 which extends transversely of the industrial truck 10. A pair of link members 56 are pivotally mounted, at their one ends, to the lower upturned portions of the vertical guide frame members 45 and, at their other ends, are pivotally mounted to the arm members 58, intermediate of the ends thereof.

A pair of rearwardly downwardly extending arm members 63 are pivotally mounted, at their upper ends, to the load engaging rack 60 and, at their lower ends, are pivotally mounted to the shoe members 44. A pair of link members 64 are pivotally mounted, adjacent their one ends, to the arm members 63, intermediate of the ends thereof, and, at their other ends, are pivotally mounted adjacent the upper ends of the vertically extending guide frame members 45.

Figure 4:
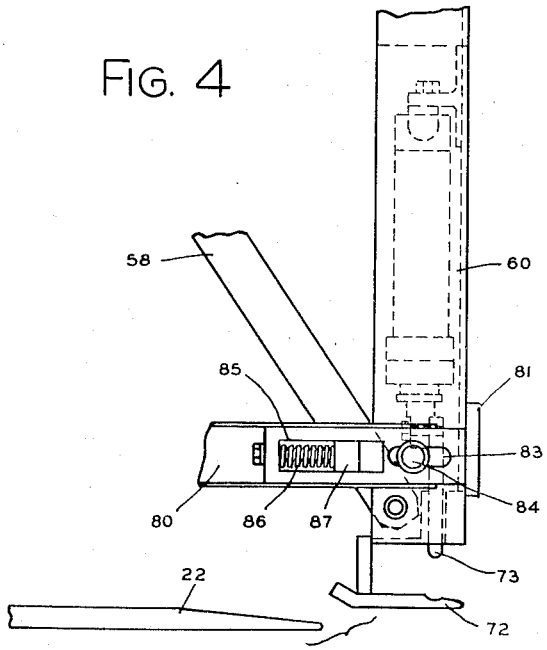
Figure 4 is a side elevational view of the clamp means of Figure 1.

Clamp means indicated generally by the reference numeral 71 is mounted along the lower edge of the load engaging rack 60. The clamp means comprises a fixed jaw member 72 and a jaw member 73 which is adapted to be moved vertically by means of hydraulic piston and cylinder assemblies, one of which is shown in dotted lines in Figure 4.

When fluid under pressure is selectively admitted to the rear ends of the cylinders 26 of the actuating assemblies 27, the piston rods 34 are extended and the load engaging rack 60 is moved to the forward end of the load supporting forks 22. When fluid under pressure is selectively admitted to the forward ends of the cylinders 26 of the actuating assemblies 27, the piston rods 34 are retracted and the load engaging rack 60 is withdrawn to a position closely adjacent the load supporting carriage 13. Small movement of the piston rods 34 produces through the linkage arrangement lying between the load supporting carriage and the load engaging racks 60 a relatively large movement of the latter thus providing for rapid extension and retraction of the rack 60. With the load engaging rack 60 in its forwardmost position, the clamp jaw 73 may be selectively moved upwardly for permitting the leading edge 75 of a sheet-like pallet 76 to be received between the movable jaw 73 and the fixed jaw 72. After the pallet edge 75 has been received between the jaws 72 and 73, the jaw 73 may be disposed downwardly for clamping the pallet edge 75 therebetween. Thereafter the load engaging rack 60 may be retracted toward the load supporting carriage 13 which will cause the pallet 76, and load 77 supported thereon, to be drawn upon the load supporting forks 22. The pallet 76 and load 77 are discharged from the load supporting forks 22 by suitably actuating the rack 60 for extending it outwardly. The particular type of linkage mechanism lying between the load supporting carriage 13 and the load engaging rack 60 and the construction of the clamp means form no part of the present invention and it is therefore believed that the foregoing description is sufficient for purposes of the present disclosure. For further details of the construction and operation of the linkage means, reference may be had to the copending application of E. Ryan Backofen, Elmer J. Dunham and Sidney R. Skellenger, Serial No. 175,264, filed July 21, 1950, now Patent No. 2,660,325 granted November 24, 1953. For further details of the construction and operation of the clamp means, reference may be had to the copending application of Elmer J. Dunham, Serial No. 92,913, filed May 12, 1949, now Patent No. 2,616,578, granted November 4, 1952. It is to be understood that our present invention may be employed with various forms of rack actuating linkage means and clamp means other than that shown and described hereinbefore.

The following is a description of the pallet retrieving means of our present invention. Pivotally mounted about a transverse axis to the side frame members 23 at the lower ends thereof are channel-shaped arm members 80. A bar 81 is disposed transversely of the load supporting forks 22, and the bar 81, at its ends, has secured at right angles thereto, flanges 82. The flanges 82 are mounted within the outer ends of the channel arm members 80 for limited longitudinal movement relative thereto. The flanges 82 are formed with lengthwise openings 83 which receive anti-friction roller assemblies 84 secured to the arm members 80. The flanges 82 are further provided with slots 85 in which are disposed coil springs 86 secured at 87 to the arm members 80.

The springs 86 permit the bar 81 to yield as the load engaging rack 60 contacts the same during the final phase of movement to its forwardmost position. By virtue of this arrangement, the bar 81 is maintained in full contact with the rack 60 insuring that the rack 60 may be disposed closely adjacent to the load 77 so that the clamp means 71 may be properly positioned to securely grip the projecting edge 75 of the sheet-like pallet 76.

After the leading edge 75 of the pallet 76 has been gripped by the clamp means 71, the bar member 81 as shown in Figure 1, serves to receive the force exerted by the side of the load 77 as the clamp means draws the pallet upon the load supporting forks 22 from beneath the load 77 when the rack 60 is retracted toward the load supporting carriage 13 from its forwardmost position. Thus, it will be seen that we have provided a pallet retrieving means whereby sheet-like pallets may be withdrawn from beneath loads automatically without interfering with the relative position of the load. During withdrawal of the pallet from beneath the load, the load will gravitate to the ground.

Figure 3:
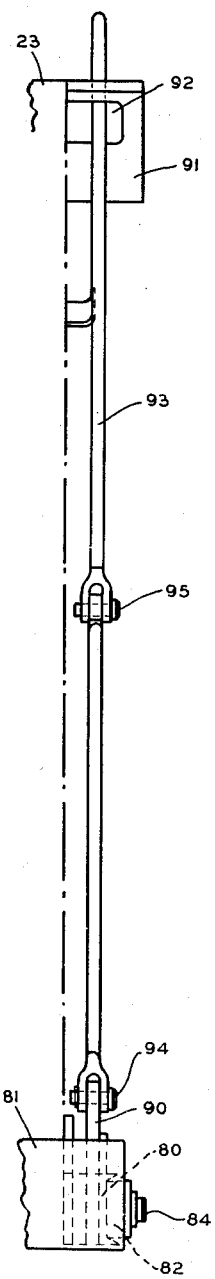
Figure 3 is a partial front elevational view of the pallet retrieving means of Figure 1.
Figure 2:
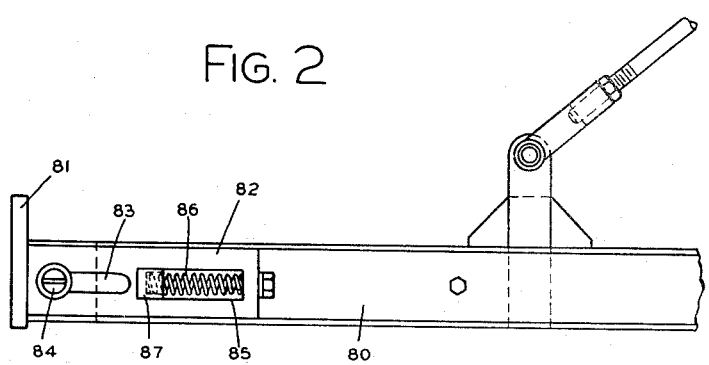
Figure 2 is a partial side elevational view of the pallet retrieving means of Figure 1.

In our present invention we also provide means for swinging the arm members 80 and bar member 81 to an inoperative substantially vertical position adjacent the frame members 23. The means for effecting swinging movement of the arm members 80 is manually operable and comprises a flange 90 secured at right angles to one of the arm members 80. Secured to the side of the frame member 23, as shown in Figure 3, is a bracket member 91 having an opening 92 formed therethrough. A control rod 93 extends through the bracket opening 92 and is pivotally connected at 94 to the arm flange 90.

When it is desired to swing the arm members 80 to a substantially vertical position, the control rod 93 is drawn rearward through the bracket opening 92. After the arm members have been swung to a substantially vertical position, the arm flange 90 projects through the bracket opening 92 whereby when the control rod 93 is permitted to pivot vertically downwardly about the point 94, the arm flange 90 is locked within the bracket 91 for maintaining the arm members 80 in a substantially vertical position. Since the control rod 93 is quite long, it is pivoted intermediate of its length at 95 to permit the halves of the control rod 93 to be folded back upon themselves.

If it is desired to return the arm members 80 to the position shown in Figure 1, the control rod 93 is straightened out and held in a substantially horizontal position whereby the latter may be pushed through the bracket opening 92 releasing the arm flange 90 from the bracket opening 92. The control rod 93 may be then pushed forwardly until the arm members 80 are in their lowermost position. The extent of downward swinging movement of the arm members 80 is preferably limited, for example, by means of a chain 98 which is pivotally mounted at 99 to the arm member 80 and at 100 to the side frame member 23.

Now, while we have shown and described what we believe to be a preferred embodiment of our present invention, it will be understood that various modifications and rearrangements may be made therein without departing from the spirit and scope of our present invention.

We claim:

1. For use with an industrial truck having an upwardly and downwardly moving load supporting carriage, a horizontal load supporting means extending forwardly from said load supporting carriage, a vertical load engaging rack extending transversely of the plane of said load supporting means, means connected between said load supporting carriage and said rack for moving the latter fore and aft above said load supporting means, clamp means carried beneath the lower leading edge of said rack and operable thereneath with vertical clamping action, and a generally U-shaped frame means movable to a position extending forwardly from the load supporting carriage such that the bight portion thereof is disposed above and forwardly of the leading edge of said load supporting means thereby to provide a barrier for preventing movement of the load toward the rack, the arrangement being such that when said clamp means is engaged with the leading edge of a planar, sheet-like, ground engaging pallet member upon which the load rests and said rack is retracted toward the load supporting carriage from its forwardmost position, the pallet member is withdrawn from beneath said load and across said load supporting means while the load is deposited directly on the ground.

2. For use with an industrial truck having an upwardly and downwardly movable load supporting carriage and a horizontal load supporting means extending forwardly from the load supporting carriage, the combination comprising, a clamp means extending transversely over said load supporting means, means for moving said clamp means fore and aft in spaced parallelism over the load supporting means, a pair of arm members pivotally mounted at one end on an axis transverse to the load supporting carriage, a bar mounted transversely between the outer free ends of said arm members, said bar being adapted to lie above the forward leading edge of the load supporting means and between said clamp means and a load when said arm members are swung forwardly to a substantially horizontal position, said bar member serving to limit movement of the load toward said load supporting means such that when a sheet-like pallet upon which the load rests is engaged along one edge by said clamp means forwardly of said load supporting means and withdrawn from beneath the load by movement of said clamp means toward the load supporting carriage, the load remains in its position forwardly of said bar means, and means for swinging said arm members to an inoperative position.

3. For use with an industrial truck having an upwardly and downwardly movable load supporting carriage, horizontal load supporting means extending forwardly from the load supporting carriage, a vertical load engaging rack extending transversely of the load supporting means, means between the load supporting carriage and the rack for moving the latter fore and aft above the load supporting means, and clamp means carried at the lower end of the rack, the combination of arm members pivotally mounted about a transverse axis to the load supporting carriage at the lower end thereof, a transverse bar mounted at its ends to the free ends of said arm members, said bar being adapted to lie above the forward edge of the load supporting means when said arm members extend forwardly and substantially horizontally whereby said bar serves to receive the force exerted by the side of a load as the clamp means engages the leading edge of a sheet-like pallet upon which the load rests and draws the pallet upon the load supporting means from beneath the load when the rack is retracted toward the load supporting carriage from its forwardmost position, and a flange secured to one of said arm members and projecting at right angles therefrom, a bracket carried by the load supporting carriage at one side thereof, said bracket having an opening therein, a control rod extending through said bracket opening and being pivotally connected to said arm flange, said control rod being adapted to be drawn rearwardly for swinging said arm members to an inoperative substantially vertical position, and said arm flange being adapted to project through said bracket opening when said arm members are substantially vertical whereby when said control rod is permitted to pivot vertically downward said arm flange is locked within said bracket for maintaining said arm members in a vertical position.

4. For use with an industrial truck having an upwardly and downwardly movable load supporting carriage, horizontal load supporting means extending forwardly from said load supporting carriage, a vertical load engaging rack extending transversely of said load supporting means, means between said load supporting carriage and said rack for moving the latter fore and aft above said load supporting means, clamp means carried at the lower end of said rack, arm members pivotally mounted about a transverse axis to the load supporting carriage at the lower end thereof, a bar extending transversely of the load supporting means, flanges secured to the ends of said bar and projecting at right angles therefrom, said flanges being mounted to the free ends of said arm members for limited longitudinal movement relative thereto, spring means for normally biasing said flanges toward the pivotal mountings of said arm members, said bar being adapted to lie above the forward edge of said load supporting means when said arm members extend forwardly and substantially horizontally, said spring means permitting said bar to yield as said rack contacts the same during final movement to its forwardmost position, and said bar being adapted to receive the force exerted by the side of a load as said clamp means engages the leading edge of a sheet-like pallet upon which the load rests and draws the pallet upon said load supporting means from beneath the load when said rack is retracted toward the load supporting carriage from its forwardmost position.

5. For use with an industrial truck having an upwardly and downwardly movable load supporting carriage, horizontal load supporting means extending forwardly from the load supporting carriage, a vertical load engaging rack extending transversely of the load supporting means, means between the load supporting carriage and the rack for moving the latter fore and aft above the load supporting means, and clamp means carried at the lower end of the rack, the combination of arm members pivotally mounted about a transverse axis to the load supporting carriage at the lower end thereof, a bar extending transversely of the load supporting means, flanges secured to the ends of said bar and projecting at right angles therefrom, said flanges being mounted to the free ends of said arm members for limited longitudinal movement relative thereto, spring means for normally biasing said flanges toward the pivotal mountings of said arm members, said bar being adapted to lie above the forward edge of the load supporting means when said arm members extend forwardly and substantially horizontally, said spring means permitting said bar to yield as the rack contacts the same during final movement to its forwardmost position, said bar being adapted to receive the force exerted by the side of a load as the clamp means engages the leading edge of a sheet-like pallet upon which the load rests and draws the pallet upon the load supporting means from beneath the load when the rack is retracted toward the load supporting carriage from its forwardmost position, a flange secured to one of said arm members and projecting at right angles therefrom, a bracket carried by the load supporting carriage at one side thereof, said bracket having an opening therein, a control rod extending through said bracket opening and being pivotally connected to said arm flange, said control rod being adapted to be drawn rearwardly for swinging said arm members to an inoperative substantially vertical position, and said arm flange being adapted to project through said bracket opening when said arm members are substantially vertical whereby when said control rod is permitted to pivot vertically downward said arm flange is locked within said bracket for maintaining said arm members in a vertical position.

References Cited in the file of this patent

UNITED STATES PATENTS

| | | |
|---|---|---|
| 2,256,454 | Bomar | Sept. 16, 1941 |
| 2,394,692 | Isler | Feb. 12, 1946 |
| 2,459,045 | Pride | Jan. 11, 1949 |
| 2,496,079 | Wessman | Jan. 31, 1950 |
| 2,584,870 | Hally | Feb. 5, 1952 |
| 2,616,578 | Dunham | Nov. 4, 1952 |
| 2,620,936 | Abbe | Dec. 9, 1952 |